(12) United States Patent
Shi et al.

(10) Patent No.: US 10,292,226 B1
(45) Date of Patent: May 14, 2019

(54) REDUCING JITTER IN A DIRECT AC LED LIGHTING DEVICE

(71) Applicant: DIALOG SEMICONDUCTOR INC., Campbell, CA (US)

(72) Inventors: Nan Shi, Campbell, CA (US); Haiju Li, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/947,674

(22) Filed: Apr. 6, 2018

(51) Int. Cl.
*H05B 33/08* (2006.01)
*H05B 37/02* (2006.01)
*H02M 1/42* (2007.01)
*H02M 7/219* (2006.01)

(52) U.S. Cl.
CPC ...... *H05B 33/0845* (2013.01); *H02M 1/4233* (2013.01); *H02M 7/219* (2013.01); *H05B 33/0806* (2013.01); *H05B 33/0815* (2013.01); *H05B 33/0821* (2013.01); *H05B 37/02* (2013.01)

(58) Field of Classification Search
CPC ............ H05B 33/0815; H05B 33/0818; H05B 33/0845; H05B 33/0809; H05B 33/0824; H05B 33/0827; H05B 33/083; H05B 33/0848; H05B 33/0857; H05B 33/086; H05B 33/08; H05B 33/089; H05B 37/02; H05B 37/0281; H05B 39/04; H05B 39/044; H05B 39/048; H05B 33/0851; Y02B 20/346; H02M 1/4233; H02M 7/219

See application file for complete search history.

(56) References Cited

U.S. PATENT DOCUMENTS

| | | | | |
|---|---|---|---|---|
| 8,760,078 B2 * | 6/2014 | McCune, Jr. | ...... | H05B 33/0815 315/291 |
| 9,024,534 B2 * | 5/2015 | McCune, Jr. | ...... | H05B 33/0815 315/246 |
| 9,083,258 B2 * | 7/2015 | Gray | ................ | H05B 33/0818 |
| 9,232,581 B2 * | 1/2016 | Wang | ................ | H05B 33/0854 |
| 9,398,656 B2 * | 7/2016 | Gray | .................... | H05B 33/083 |
| 9,565,726 B2 * | 2/2017 | McCune, Jr. | ...... | H05B 33/0815 |
| 9,706,612 B2 * | 7/2017 | Ramaker | ............ | H05B 33/0815 |

* cited by examiner

*Primary Examiner* — Vibol Tan
(74) *Attorney, Agent, or Firm* — Haynes & Boone, LLP

(57) ABSTRACT

A direct AC LED lighting device is provided with a low-pass filter for filtering a threshold time in which a post diode bridge voltage exceeds an LED threshold voltage during a current AC half cycle for the post diode bridge voltage.

19 Claims, 5 Drawing Sheets

REDUCING JITTER IN A DIRECT AC LED LIGHTING DEVICE

TECHNICAL FIELD

This application relates to direct AC LED lighting devices, and more particularly to a direct AC LED lighting device with reduced jitter.

BACKGROUND

The replacement of incandescent bulbs by light emitting diode (LED) lighting devices reduces energy consumption due to the high efficiency of LED devices as compared to incandescent bulbs. But an incandescent bulb may be directly driven by the AC mains in contrast to conventional LED devices. It is thus conventional for an LED device to include a switching power converter such as a flyback converter to provide a regulated DC current for driving the LED. This need for a switching power converter raises costs and thus diminishes a consumer's desire to switch to LED devices. A consumer may thus continue to use incandescent bulbs, which contributes to global warming due to the increased greenhouse gas emissions from the resulting energy consumption.

To lower LED device costs, direct AC LED devices (which may also be denoted as direct AC LED bulbs) have been developed that obviate the need for a switching power converter. In a direct AC LED device, the AC mains voltage is rectified through a rectifier such as a bridge diode rectifier to produce a rectified AC input voltage. The LED in a direct AC LED device is directly driven by the rectified AC input voltage. Although no switching power converter is thus needed to convert the rectified AC input voltage into a regulated DC current/voltage, a direct AC LED device still needs a controller to control the LED power. In particular, the controller controls an LED current source in series with the LED. When the rectified AC input voltage (which may also be denoted as a post diode bridge voltage) rises above the LED threshold voltage for the LED, the controller controls the LED current by controlling the LED current source so that the LED power may be controlled accordingly.

The presence of a phase-cut dimmer switch in household applications complicates the control of direct AC LED lighting devices. In particular, a phase cut dimmer's TRIAC requires a minimum amount of holding current when conducting to prevent the TRIAC from resetting. But the post diode bridge voltage may not have exceeded the LED threshold voltage when the TRIAC begins conducting. A direct AC LED lighting device 100 that is compatible with phase-cut dimming applications thus will typically include a bleeder circuit 110 as shown in FIG. 1. A dimmer switch is represented by a TRIAC that intervenes between an AC mains (AC_Input) and a diode bridge (DB). The diode bridge rectifies a phase-cut AC input from the TRIAC to produce the post diode bridge voltage carried on a power rail 105. Bleeder circuit 110 couples to power rail 105 to conduct a holding current into ground. A controller (I_CNTRL) controls a current through an LED string by controlling an LED current source 115.

The dimmer switch has an internal RC circuit (not illustrated) that controls its firing time in each AC half cycle. But this firing time is subject to change due to variations in DIAC threshold voltage and RC integration current for the dimmer switch. The firing time is thus typically subject to 50 to 100 µs of jitter from a given AC half cycle to a subsequent AC half cycle. The resulting jitter is shown in FIG. 2 for a leading edge phase cut dimmer. In each AC half cycle, the post diode bridge voltage rises above the LED threshold voltage so that the LED current can flow. But the TRIAC firing time for a subsequent AC half cycle 205 is delayed as compared to the TRIAC firing time for an initial AC half cycle 200 by the typical dimmer switch jitter of 50 to 100 µs. This jitter is significant enough to cause random light intensity changes that are detectable by the human eye. The resulting rapid variation in the LED illumination is disconcerting and discourages users to switch from incandescent lighting to direct AC LED devices.

Accordingly, there is a need in the art for direct AC LED devices with reduced jitter in the presence of a phase-cut dimmer switch.

SUMMARY

A direct AC LED lighting device is provided that includes a LED on-time controller that filters out variations in the TRIAC on times for a phase-cut dimmer switch. Should the TRIAC on time be increased or decreased from one AC half cycle to the next due to jitter, the LED on time in a conventional direct AC LED lighting device would be varied accordingly. But the LED on-time controller disclosed herein advantageously maintains the LED on time from one AC half cycle to the next to be relatively constant despite jitter-induced variations in the TRIAC on-times.

These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

An improved direct AC LED lighting device is disclosed having reduced jitter despite being driven by a phase-cut dimmer switch. To achieve the reduced jitter, a controller controls the LED on time deviation across the AC half cycles. In particular, the controller (which is also referred to herein as an LED on time controller) limits the LED on time variation from one AC half cycle to the next by controlling an LED current source in series with the LED (or LED string). For example, the controller may limit the LED on time variation between a current AC half cycle and a subsequent AC half cycle to be no more than 10%. It will be appreciated that other percentages may be used in alternative embodiments. The key is that the controller allows for long-term variation of the LED on time so that the LED illumination responds to a user's actuation of the phase-cut dimmer switch while eliminating or sharply reducing short-term variation (jitter).

Figure 1:
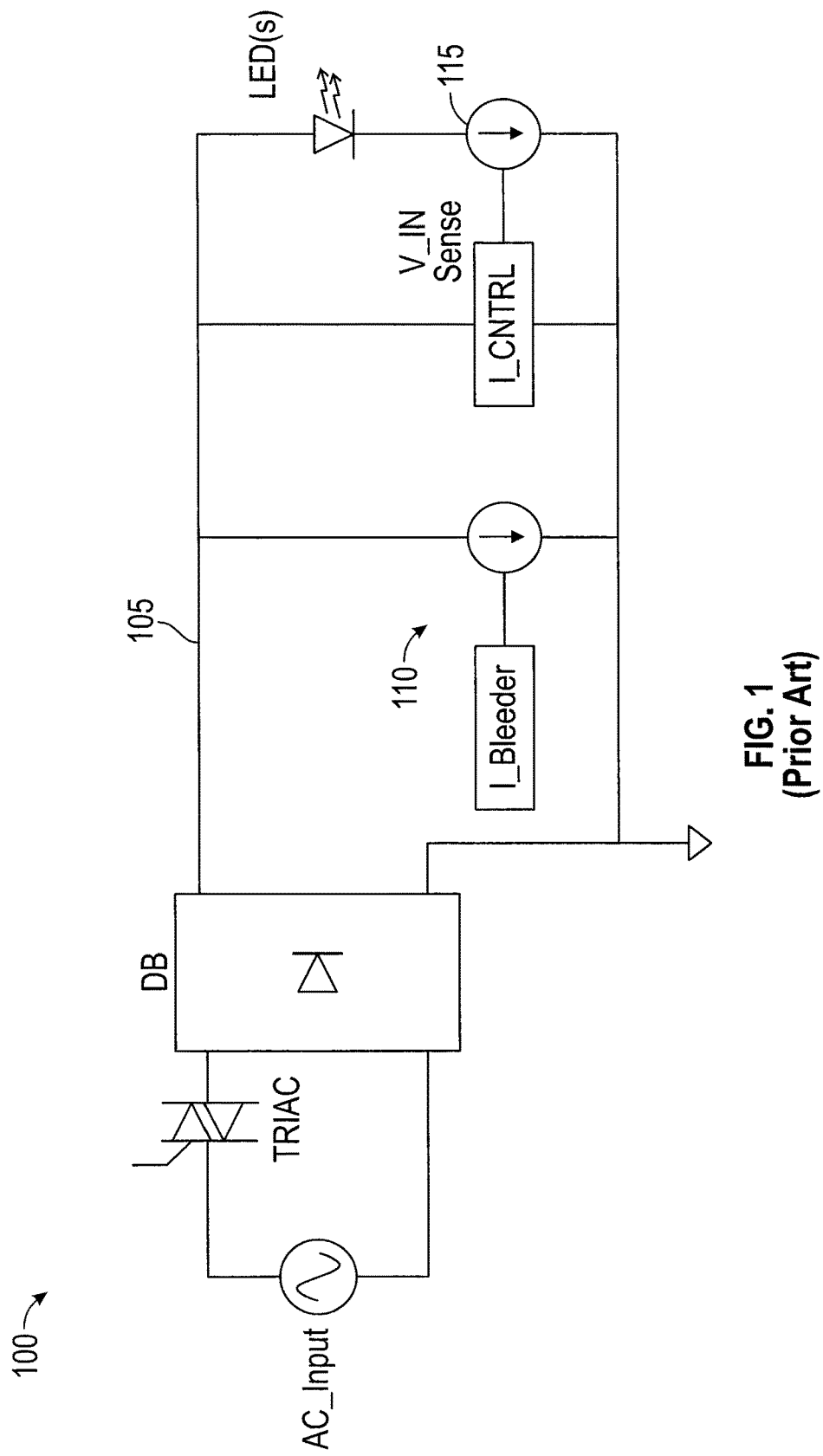
FIG. 1 illustrates a conventional direct AC LED lighting device driven through a phase-cut dimmer switch.
Figure 2:
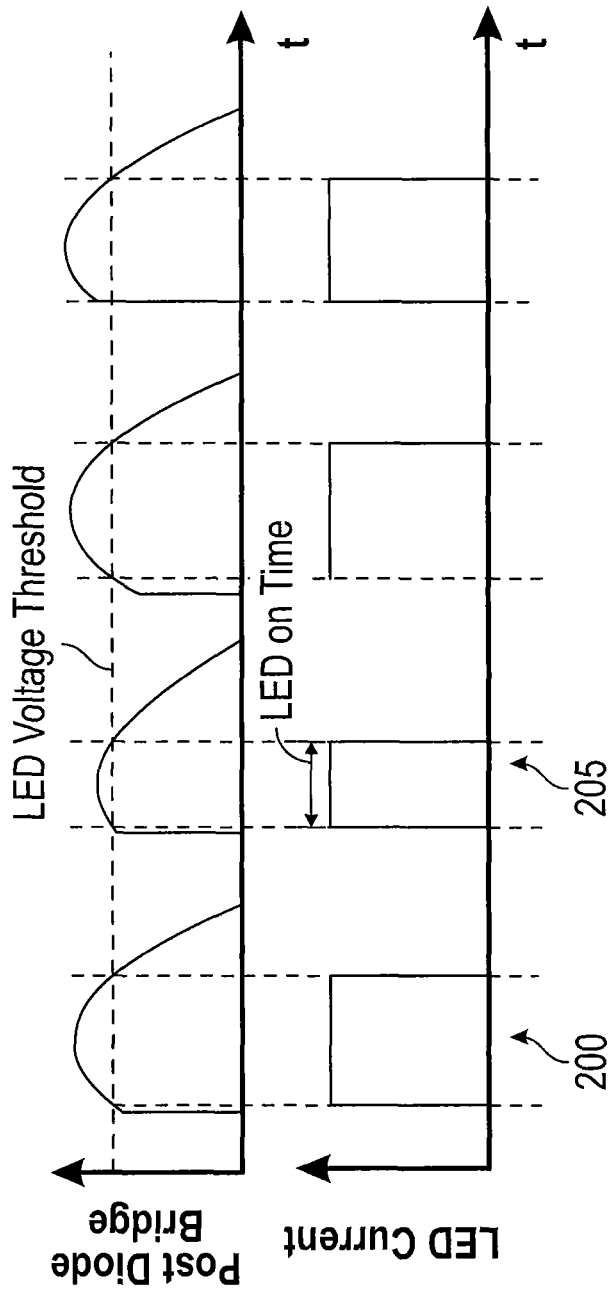
FIG. 2 illustrates the post diode bridge voltage and LED current waveforms for the conventional direct AC LED lighting device of FIG. 1.
Figure 3:
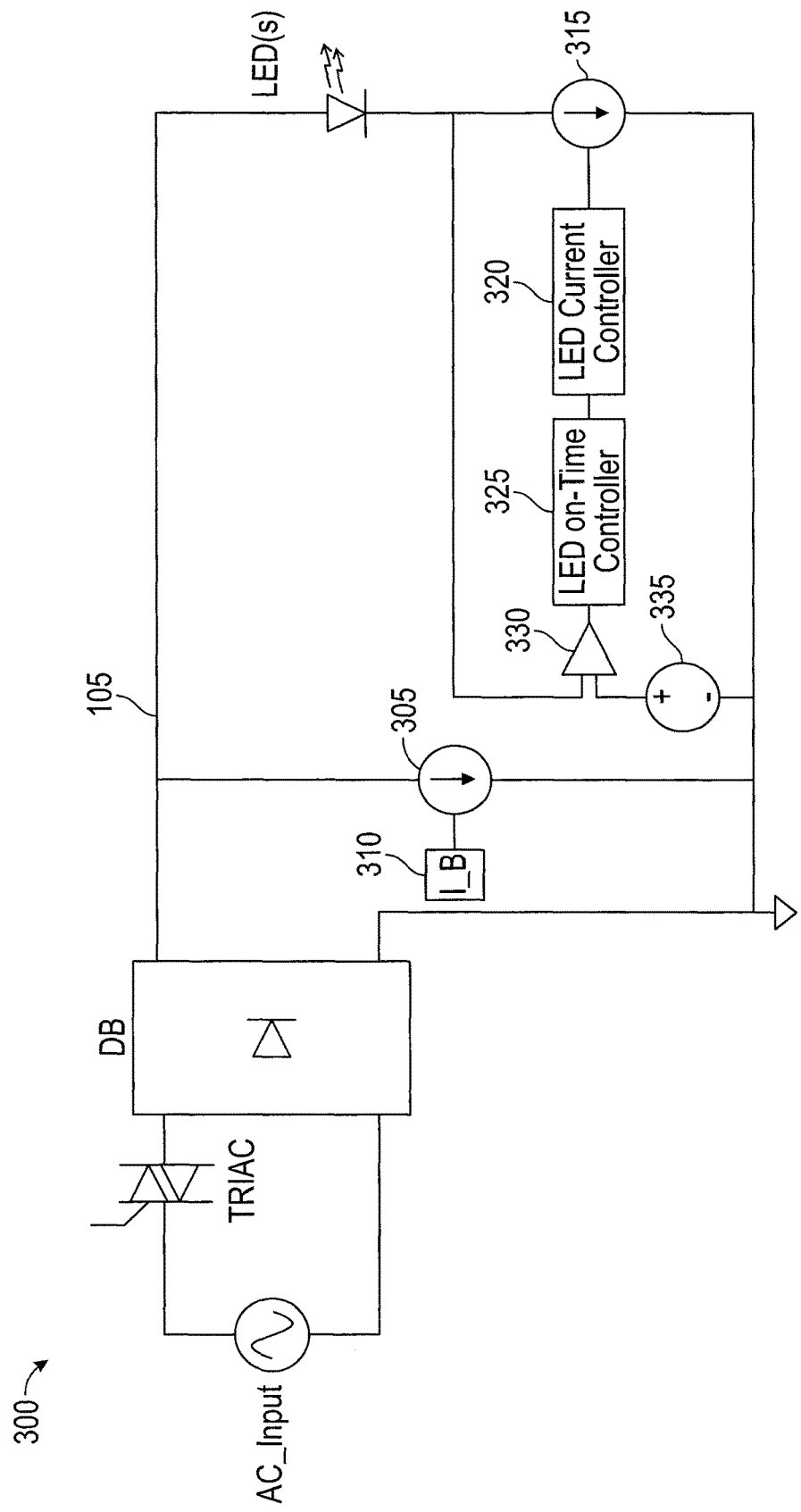
FIG. 3 illustrates a direct AC LED lighting device system including a phase-cut dimmer switch in accordance with an aspect of the disclosure.

An example direct AC LED lighting device system 300 is shown in FIG. 3. A dimmer switch represented by a TRIAC phase cuts an AC input (AC_Input) voltage from an AC mains to drive a diode bridge (DB) rectifier. The diode bridge rectifies the phase-cut voltage to produce a post diode bridge voltage carried on power rail 105 as discussed with regard to FIG. 1. A bleeder circuit current source 305 is controlled by a bleeder circuit controller (I_B) 310 to conduct a minimum holding current for the TRIAC to keep the TRIAC from resetting while the TRIAC is conducting. In one embodiment, bleeder circuit controller 310 can simply maintain bleeder circuit current source 305 continually on. In an alternative embodiment, bleeder circuit controller 310 senses the on and off state of the TRIAC so that bleeder circuit current source 305 only conducts the minimum holding current while the TRIAC conducts and an LED is not conducting. In such an embodiment, bleeder circuit current source 305 would not conduct while the TRIAC is off to reduce power consumption. Similarly, bleeder circuit current source 305 would not conduct while the LED is conducting since the minimum holding current is then supported by the LED current conduction.

An LED (typically an LED string) couples between power rail 105 and an LED current source 315 controlled by a LED current controller 320. LED current controller 320 controls the level of the LED current to control the LED power and luminosity according to a manufacturer's guidelines. But the LED on times are controlled by a LED on-time controller 325. LED current controller 320 thus prevents LED current source 315 from conducting despite the post diode bridge voltage exceeding the LED threshold voltage if the resulting LED on time for a current AC half cycle (for the AC mains and also the post diode bride voltage) would deviate too much from the LED on time for a preceding AC half cycle. LED on-time controller 325 thus needs a way to determine whether the LED threshold voltage has been exceeded. In one embodiment, system 300 includes an on-time comparator 330 to make such a determination by comparing a positive reference voltage from a voltage source 335 to a voltage of a node between a cathode of the LED and LED current source 315. Should the post diode bridge voltage exceed the LED threshold voltage, the LED will conduct charge sufficient to charge this node even through LED current source 315 is not conducting. Comparator 330 compares the node voltage to the positive reference voltage to minimize the effects of noise that would occur should comparator 330 instead compare the node voltage directly to ground. But the positive reference voltage may be relatively small so that comparator 330 can accurately determine when the LED threshold voltage has been exceeded. It will be appreciated that comparator 330 may be integrated with LED on-time controller 325 and LED current controller 320 into a single integrated circuit. Such an integrated circuit may also include LED current source 315.

Figure 4:
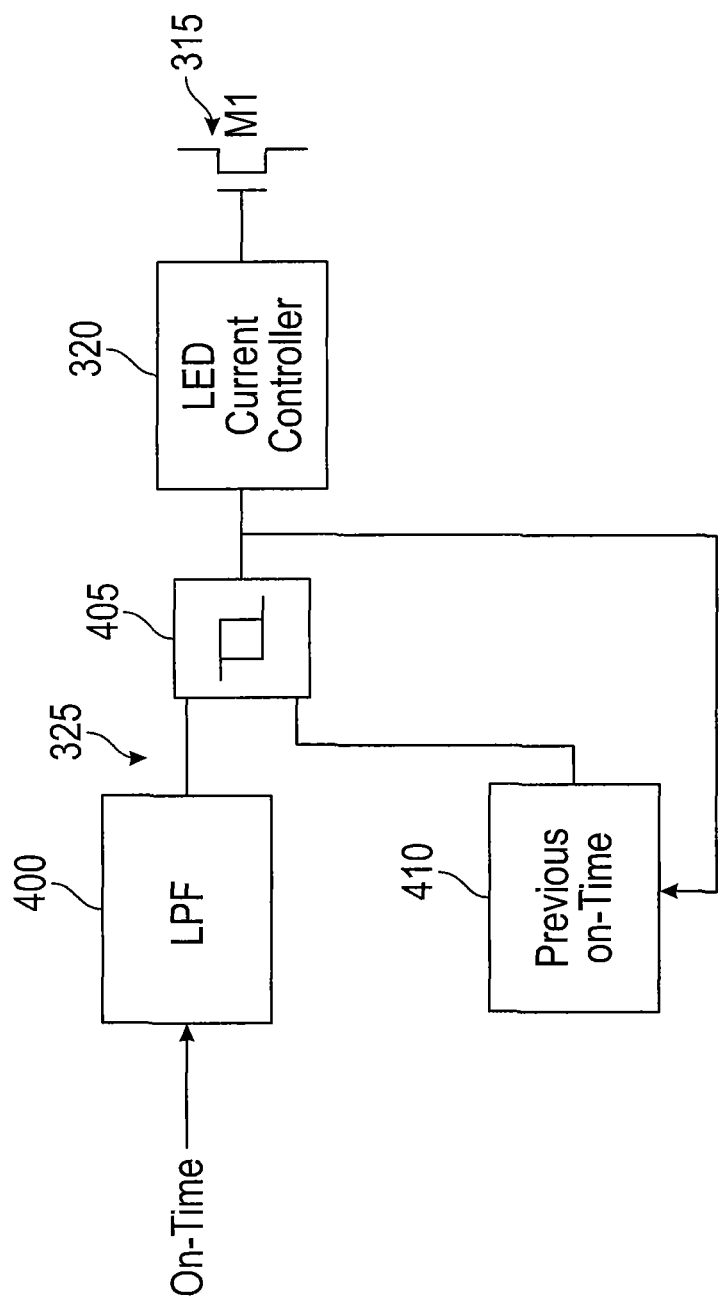
FIG. 4 is a diagram of the LED on-time controller in the direct AC LED lighting device of FIG. 3 in accordance with an aspect of the disclosure.

LED on-time controller 325 is shown in more detail in FIG. 4. The duration of time in which the post diode bridge voltage exceeds the LED threshold voltage in a current AC half cycle for the post diode bridge voltage is also denoted herein as the threshold time. The threshold time is filtered by a low pass filter (LPF) 400 to produce a low-pass-filtered-on-time that is compared by a hysteresis comparator 405 to the on time for a previous AC half cycle. Hysteresis comparator 405 functions to assert its output signal over a duration equaling the previous on time if the low-pass-filtered-on-time is within a hysteresis amount (e.g., +/−10%) of the previous on time. Conversely, hysteresis comparator 405 functions to assert its output signal for the low-pas-filtered-on-time if the low-pass-filtered-on-time is outside of the hysteresis limit from the previous on time. It will thus be appreciated that hysteresis comparator 405 includes a multiplexer (not illustrated) that selects between the low-pass-filtered-on-time and the previous on time to form its output signal. The comparison by hysteresis comparator 405 controls the multiplexer selection accordingly. The duration of the assertion of the output signal from hysteresis comparator 405 determines the LED on time (current on time) in the current AC half cycle for the post diode bridge voltage. The hysteresis in hysteresis comparator 405 prevents the LED on time from responding to jitter-induced changes in the low-pass-filtered-on-time. But should a user sufficiently change the phase-cut dimming applied by the TRIAC, the changes in the low-pass-filtered-on-time will exceed the hysteresis limits in comparator 405 so that the LED lighting dims or brightens depending upon the user's input. The output of hysteresis comparator 405 is fed back to a memory 410 so that it can be stored to form the previous on-time in the subsequent AC half cycle. The assertion of the output signal from comparator 405 corresponds to the LED on time for the current AC half cycle. In particular, LED current controller 320 responds to the assertion of the output signal from comparator 405 by switching on current source 315 to conduct the desired level of LED current. For example, current source 315 may comprise a MOSFET M1 in one embodiment. LPF 400 may comprise a digital low pass filter or an analog low pass filter. In an analog embodiment, memory 410 may comprise a capacitor for storing the voltage that represents the on time for the LED current in a current AC half cycle. In a digital embodiment, memory 410 may comprise a plurality of registers for storing a digitized version of the LED on time.

Figure 5:
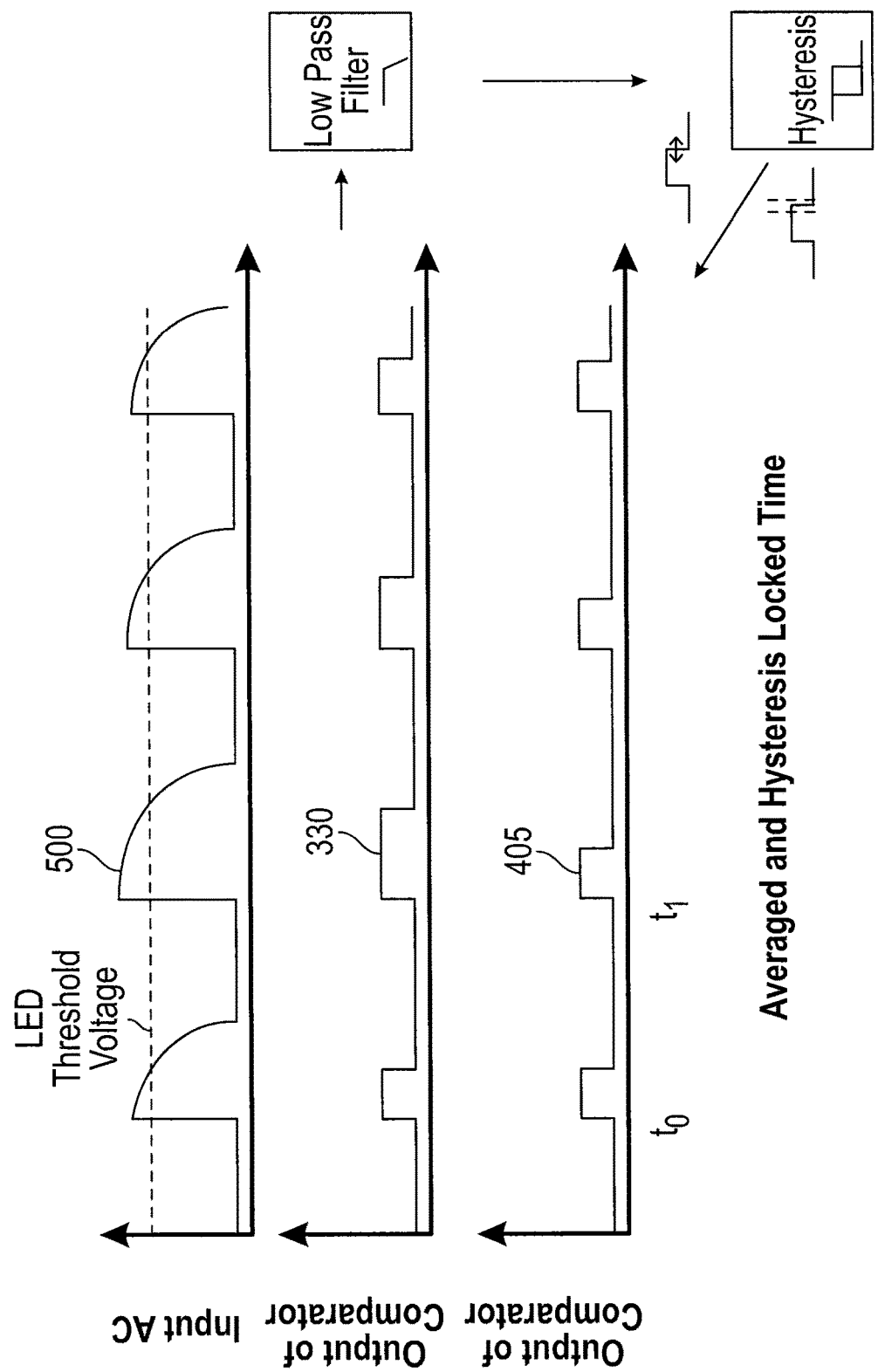
FIG. 5 illustrates the post diode bridge voltage and comparator output signals for the LED on-time controller of FIG. 4 in accordance with an aspect of the disclosure.

An example post diode bridge waveform 500 for system 300 is shown in FIG. 5 over several AC half cycles. In a second AC half cycle starting at a time t1, the post diode bridge voltage exceeds the LED threshold voltage for a longer period as compared to a preceding AC half cycle starting at a time t0. Comparator 330 measures the duration or period of time in which the post diode bridge voltage exceeds the LED threshold voltage. Thus the output signal from comparator 330 will be asserted for a longer period in the AC half cycle at time t1 as compared to the AC half cycle at time t0. Such a variation in the amount of time that the post diode voltage exceeds the LED threshold voltage from one AC half cycle to the next AC half cycle would cause jitter-induced variations in the LED luminosity for conventional system 100. But the output of comparator 405 does not respond to such jitter-induced variations such that the resulting LED luminosity is advantageously resistant to jitter-induced variations in the TRIAC on times.

It will be appreciated that numerous modifications may be made to system 300. For example, it is conventional for the output of a TRIAC to be asymmetrical due to the asymmetric nature of its components. In particular, the resulting TRIAC on times in a conventional LED system including such an asymmetric TRIAC periodically alternate between a relatively long TRIAC on times and relatively shorter TRIAC on times. In such an embodiment, LED on-time controller 325 may be configured to only respond to the relatively shorter TRIAC on times. Similarly, when the post diode bridge voltage barely exceeds the LED threshold voltage, it results in very short periods in which the output signal from comparator 330 is asserted. LED on-time controller 325 may be configured to prevent the LED current from flowing in response to such relatively brief post diode bridge voltage periods.

Thus, as those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A direct AC LED lighting device controller, comprising:
    an LED current source configured to control a current in an LED;
    an LED on-time controller including a low-pass filter configured to low-pass filter a threshold time in which a post diode bridge voltage exceeds an LED threshold voltage in a current AC half cycle for the post diode bridge voltage to produce a filtered LED on time and further including a hysteresis comparator configured to compare the filtered LED on time to a previous LED on time for a previous AC half cycle for the post diode bridge voltage to produce a current LED on time; and
    an LED current controller configured to switch the LED current source on for the current LED on time in the current AC half cycle for the post diode bridge voltage.

2. The direct AC LED lighting device controller of claim 1, wherein the low-pass filter comprises a digital low-pass filter.

3. The direct AC LED lighting device controller of claim 1, wherein the low-pass filter comprises an analog low-pass filter.

4. The direct AC LED lighting device controller of claim 1, wherein the LED current source comprises a MOSFET.

5. The direct AC LED lighting device controller of claim 1, further comprising an on-time comparator configured to determine the threshold time.

6. The direct AC LED lighting device controller of claim 5, wherein the on-time comparator is configured to determine the threshold time by comparing a node voltage of a node between a cathode of the LED and the LED current source with a positive reference voltage.

7. The direct AC LED lighting device controller of claim 6, further comprising a voltage source for producing the positive reference voltage.

8. The direct AC LED lighting device controller of claim 1, further comprising a bleeder circuit configured to conduct a minimum holding current for a TRIAC device in a phase-cut dimmer switch.

9. The direct AC LED lighting device controller of claim 2, further comprising a memory for storing the current LED on time.

10. The direct AC LED lighting device controller of claim 1, wherein the LED threshold voltage is a threshold voltage for an LED string.

11. A method, comprising:
    measuring a threshold time for a current AC half cycle for a post diode bridge voltage during which the post diode bridge voltage exceeds an LED threshold voltage for an LED; and
    controlling the LED to switch on during the current AC half cycle for a current on time equaling a previous LED on time during a previous AC half cycle for the post diode bridge voltage responsive to the threshold time having less than a threshold change from the previous LED on time, wherein measuring the threshold time comprises comparing a node voltage for a node between a cathode of the LED and an LED current source to a positive reference voltage.

12. The method of claim 11, further comprising controlling the LED to switch on during the current AC half cycle for an on time not equaling the previous LED on time responsive to the threshold time having greater than the threshold change from the previous LED on time.

13. The method of claim 11, further comprising:
    low pass filtering the threshold time to produce a filtered on time; and
    comparing the filtered on time to the previous on time to determine whether the threshold time has less than the threshold change from the previous LED on time.

14. The method of claim 11, further comprising:
    conducting a minimum holding current from a power rail carrying the post diode bridge voltage to prevent a TRIAC device from resetting.

15. A direct AC LED lighting device, comprising:
    a power rail for carrying a post diode bridge voltage from a diode bridge;
    an LED configured to receive an LED current from the power rail;
    an LED current source in series with the LED to control the LED current; and
    an LED on-time controller including a low-pass filter configured to low-pass filter a threshold time in which the post diode bridge voltage exceeds an LED threshold voltage for the LED in a current AC half cycle for the post diode bridge voltage to produce a filtered LED on time and further including a hysteresis comparator configured to compare the filtered LED on time to a previous LED on time for a previous AC half cycle for the post diode bridge voltage to produce a current LED on time, wherein the LED on-time controller is further configured to control the LED current source so that it conducts the LED current only during the current LED on time in the current AC half cycle for the post diode bridge voltage.

16. The direct AC LED lighting device of claim 15, wherein the low-pass filter comprises a digital low-pass filter.

17. The direct AC LED lighting device of claim 15, wherein the low-pass filter comprises an analog low-pass filter.

18. The direct AC LED lighting device of claim 15, wherein the LED current source comprises a MOSFET.

19. The direct AC LED lighting device of claim 15, further comprising an on-time comparator configured to determine the threshold time.

* * * * *